United States Patent
Cooper et al.

(10) Patent No.: US 10,419,433 B2
(45) Date of Patent: Sep. 17, 2019

(54) NETWORK CREDENTIALS FOR WIRELESSLY ACCESSING A LAN VIA AN ALTERNATE COMMUNICATIONS NETWORK

(71) Applicant: LENOVO ENTERPRISE SOLUTIONS (SINGAPORE) PTE. LTD., Singapore (SG)

(72) Inventors: Ralph S. Cooper, Durham, NC (US); Joshua L. Hager, Raleigh, NC (US); Nathan J. Peterson, Durham, NC (US); David Smith, Raleigh, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 112 days.

(21) Appl. No.: 15/174,342

(22) Filed: Jun. 6, 2016

(65) Prior Publication Data
US 2017/0353454 A1 Dec. 7, 2017

(51) Int. Cl.
*H04L 29/06* (2006.01)
*H04W 12/08* (2009.01)

(52) U.S. Cl.
CPC .............. *H04L 63/10* (2013.01); *H04L 63/08* (2013.01); *H04W 12/08* (2013.01)

(58) Field of Classification Search
CPC ......... H04L 63/08; H04L 63/10; H04W 12/08
USPC .......................................................... 726/7
See application file for complete search history.

(56) References Cited

U.S. PATENT DOCUMENTS

| | | | | |
|---|---|---|---|---|
| 6,816,900 B1* | 11/2004 | Vogel | ............... | H04L 9/3236 709/203 |
| 9,866,545 B2* | 1/2018 | Beecham | ............... | H04L 63/08 |
| 9,872,240 B2* | 1/2018 | Kim | ............... | H04W 48/16 |
| 2006/0173976 A1* | 8/2006 | Vincent | ............... | H04L 63/08 709/220 |
| 2007/0280152 A1* | 12/2007 | Thomson | ............ | G01C 21/206 370/328 |
| 2011/0047603 A1* | 2/2011 | Gordon | ............... | H04L 63/06 726/5 |
| 2012/0093083 A1* | 4/2012 | Plestid | ............... | H04W 12/06 370/328 |
| 2014/0004854 A1* | 1/2014 | Veran | ............... | H04W 48/18 455/432.1 |
| 2016/0094537 A1* | 3/2016 | Zucker | ............... | H04W 12/06 726/7 |

(Continued)

OTHER PUBLICATIONS

Neuman, B. Clifford, and Theodore Ts'o. "Kerberos: An authentication service for computer networks." IEEE Communications magazine 32.9 (1994): 33-38.*

(Continued)

*Primary Examiner* — Syed A Zaidi
(74) *Attorney, Agent, or Firm* — Philip Weinstein; Andrew M. Calderon; Roberts Mlotkowski Safran Cole & Calderson, P.C.

(57) ABSTRACT

A computer-implemented method includes: connecting, by a network device, with a user device via an alternate communications network; and providing, by the network device to the user device and via the alternate communications network, network credentials used for wireless access to a primary communications network, wherein the primary communications network and the alternate communications network are different.

17 Claims, 8 Drawing Sheets

(56) References Cited

U.S. PATENT DOCUMENTS

2017/0195319 A1\* 7/2017 Gerber ............... H04L 63/0838
2017/0346804 A1\* 11/2017 Beecham ............... H04L 63/08

OTHER PUBLICATIONS

Balfanz et al., "Talking to Strangers: Authentication in Ad-Hoc Wireless Networks", 2002, 13 pages.

"Can you obtain WiFi settings from iOS and pass it to a BLE device (similar to Withings)?", http://stackoverflow.com/questions/23113936/can-you-obtain-wifi-settings-from-ios-and-pass-it-to-a-ble-device-similar-to-wi, accessed on Mar. 29, 2016, 2 pages.

Heitzeberg, "Eight Ways to Solve the Wi-Fi Authentication Issue for Devices", http://www.hackthings.com/solving-the-wifi-authentication-issue-for-devices/, Apr. 13, 2013, 3 pages.

Fitchard, "Wi-Fi teams up with NFC to create secure connections with a simple tap", https://gigaom.com/author/kfitchard, Apr. 9, 2014, 5 pages.

Padilla, "How to Use 'Instant Hotspot' On a Mac with OS X Yosemite", http://www.macrumors.com/2014/10/23/how-to-instant-hotspot, Oct. 22, 2014, 11 pages.

Kuo et al., "Low-cost Manufacturing, Usability, and Security: An Analysis of Bluetooth Simple Pairing and Wi-Fi Protected Setup", 2007, 15 pages.

\* cited by examiner

NETWORK CREDENTIALS FOR WIRELESSLY ACCESSING A LAN VIA AN ALTERNATE COMMUNICATIONS NETWORK

TECHNICAL FIELD

The present disclosure relates generally to providing network credentials to a user device and, more particularly, to providing network credentials to a user device via an alternate communications network.

BACKGROUND

User devices, such as laptop computers, desktop computers, tablets, smart phones, mobile computing devices, and/or consumer electronics devices (e.g., a network-enabled televisions, set-top boxes, or the like) may wirelessly access a local area network (LAN) via a network device (e.g., router, hub, or access point) that hosts and/or provides wireless access to the LAN. To prevent unauthorized wireless access of the LAN, the network device may implement security protocols, such as wireless access lists, and/or the use of network credentials to permit wireless access (e.g., a WiFi Protected Access (WPA) password or the like). A user of a user device may input the network credentials in order for the user device to wirelessly access the LAN.

Sharing of network credentials may be insecure, as the network credentials can be shared with unauthorized users. Current solutions for streamlining wireless access to a LAN may include the use of WiFi protected setup (WPS) in which a WiFi connection, PIN code, and/or Near Field Communications (NFC) are used to configure a user device for wirelessly accessing the LAN. However, the use of the WiFi connection and/or PIN can be breached using a brute force method. Further, the use of NFC requires the user device to be within a very close range (e.g., a few centimeters or less) of the network device.

SUMMARY

In an aspect of the disclosure, a computer-implemented method includes: connecting, by a network device, with a user device via an alternate communications network; and providing, by the network device to the user device and via the alternate communications network, network credentials used for wireless access to a primary communications network, wherein the primary communications network and the alternate communications network are different.

In an aspect of the disclosure, there is a computer program product for automatically configuring a user device to wireless access a local area network (LAN) associated with a network device. The computer program product comprises a computer readable storage medium having program instructions embodied therewith, the program instructions executable by a user device to cause the user device to: connect with a network device via an alternate communications network; receive network credentials from the network device; and wirelessly connect to the LAN using the received network credentials.

In an aspect of the disclosure, a system includes: a CPU, a computer readable memory and a computer readable storage medium associated with a network device; program instructions to connect with a user device via an alternate communications network; and program instructions to provide, to the user device and via the alternate communications network, network credentials used to wireless access a primary communications network associated with the network device to cause the user device to receive and store the network credentials. The program instructions are stored on the computer readable storage medium for execution by the CPU via the computer readable memory.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1:
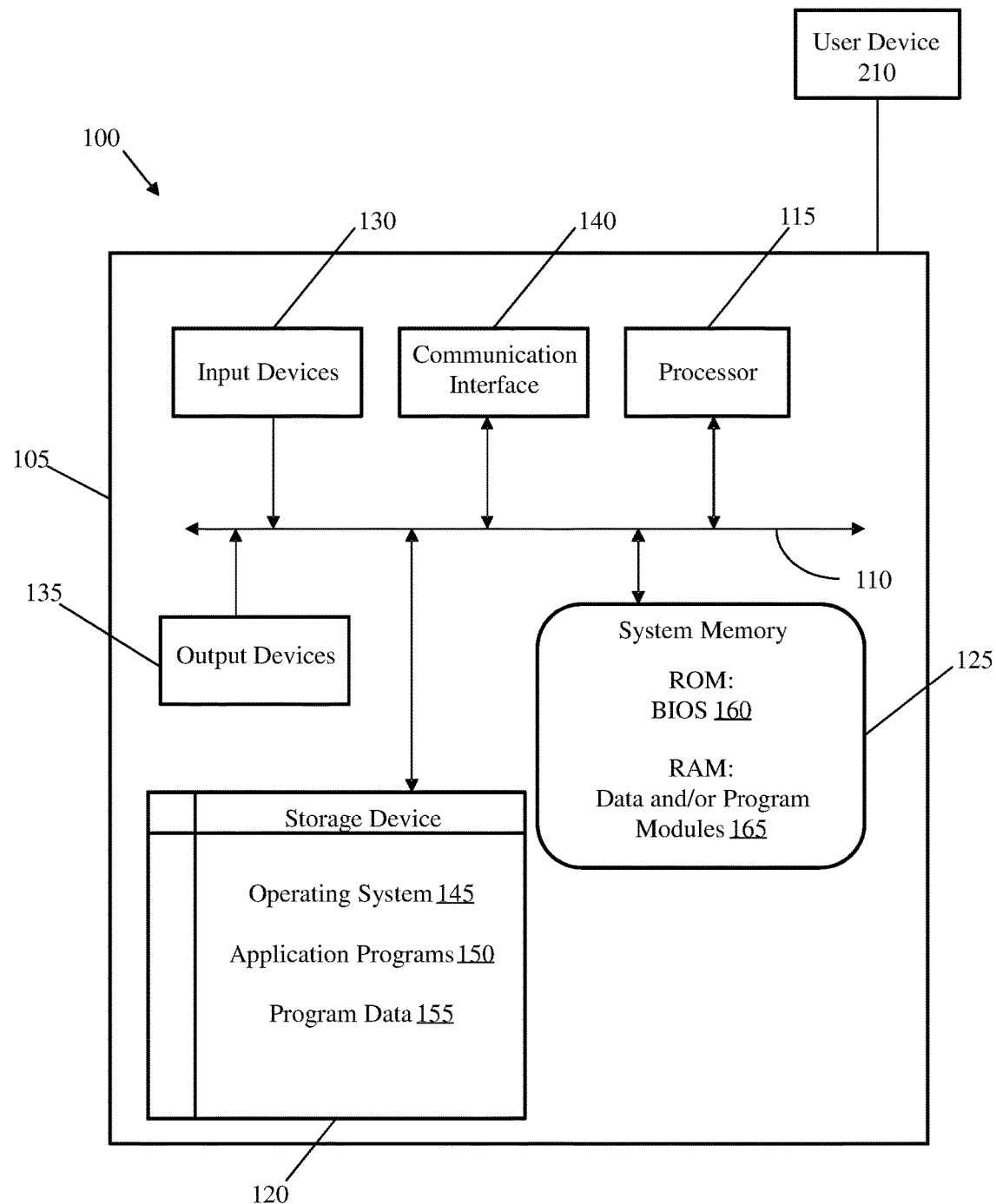
FIG. 1 shows an illustrative architecture of a computing system implementing aspects of the present disclosure.

The present disclosure relates generally to providing network credentials to a user device and, more particularly, to providing network credentials to a user device via an alternate communications network. In embodiments, for example, the systems and methods described herein allow a user device, e.g., laptop, mobile device, etc. to can access a local area network (LAN) without the need to manually input network credentials of the LAN. This is particularly advantageous for initially configuring a user device to wirelessly access the LAN. Further, providing network credentials via the alternate communications network is advantageous for maintaining and storing up-to-date network credentials on the user device without the need to manually update network credentials each time the network credentials are updated.

As should be understood by those of skill in the art, a user or group of users (e.g., a family, business organization, etc.) may use multiple different user devices to wirelessly access a single LAN. For example, a domestic household may include a variety of laptops, desktop computers, tablets, smart phones, network-enabled televisions, set-top boxes, etc. that may access the LAN for various applications (e.g., web-browsing, electronic communications, media streaming, etc.). Configuring user devices to wirelessly access a LAN can be time consuming, particularly when a user wishes to configure a relatively large quantity of user devices to wirelessly access the LAN. For example, a user would need to input network credentials of the LAN for each user device (e.g., a network ID, a password, or the like). Further, when network credentials are updated, the updated network credentials would again need to be inputted into each user device which can be time consuming, particularly for user devices that do not include a keyboard for inputting network credentials (e.g., for network-enabled televisions and set-top boxes that require the use of a remote control to scroll through an on-screen keyboard to input network credentials).

Accordingly, by implementing the systems and methods described herein, a user device can be provided with network credentials used to access a LAN without any manual input. For example, the network credentials may be provided to the user device via an alternate communications network (e.g., a Wireless Personal Access Network (WPAN), such as a Bluetooth® network, a ZigBee® network, or the like). To implement the systems and methods described herein, in embodiments, the network device and the user device may include alternate network communications hardware (e.g., a Bluetooth radio) such that a connection (e.g., a Bluetooth connection) with the user device may be established with a network device of the LAN. In this way, the network device may provide the user device with network credentials that the user device may store and use to wirelessly access the LAN associated with the network device. And, in this way, a user of the user device would not need to manually input network credentials in order for the user device to access the LAN.

As described herein, updated network credentials may be provided to multiple user devices via the alternate communications network, e.g., Bluetooth, such that user input of updated credentials is not needed at each user device. In embodiments, a connection between the user device and the network device via the alternate communications network may be established using a secure PIN. Further, the user device may receive the network credentials, once authorized by an administrative device. For example, the administrative device may be preconfigured to authorize user devices that are permitted to receive the network credentials and wireless access the LAN.

Advantageously, significant time and effort is saved for initially configuring a user device to wireless access a LAN. Further, significant time and effort is saved when updating network credentials, as the updated network credentials need not be inputted into each user device. Instead, authorized user devices may automatically receive updated network credentials via the alternate communications network. In embodiments, the alternate network communications hardware may have a wireless communications range similar to that of primary communications hardware (e.g., WiFi connection adapters, etc.). In this way, the user device may communicate with the network device via the alternate communications network to receive network credentials when the user device is located in the same physical location as wireless LAN associated with the network device.

FIG. 1 shows an illustrative architecture of a computing system implementing aspects of the present disclosure. The computing system 100 is only one example of a suitable computing system and is not intended to suggest any limitation as to the scope of use or functionality of the embodiments described herein. The computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, the bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of the computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, the processor 115 interprets and executes the processes, steps, functions, and/or operations of one or more embodiments described herein, which may be operatively implemented by the computer readable program instructions. For example, the processor 115 may connect with a user device 210 via an alternate communications network, receive device information for the user device 210 via the alternate communications network, determine whether the user device 210 is authorized to receive network credentials based on the device information, and provide the network credentials to the user device 210 via the alternate communications network. In this way, it is possible for the user device 210 to access a LAN without the need to manually input the network credentials.

In embodiments, processor 115 may receive input signals from one or more input devices 130 and/or drive output signals through one or more output devices 135. The input devices 130 may be, for example, a keyboard or touch sensitive user interface (UI). The output devices 135 can be, for example, any display device, printer, etc.

The storage device 120 may include removable/non-removable, volatile/non-volatile computer readable media, such as, but not limited to, non-transitory media such as magnetic and/or optical recording media and their corresponding drives. The drives and their associated computer readable storage media provide for storage of computer readable program instructions, data structures, program modules and other data for operation of the computing device 105 in accordance with the different aspects of the present disclosure. In embodiments, a storage device 120 may store an operating system 145, an application programs 150, and program data 155 that perform the processes of one or more embodiments.

The system memory 125 may include a computer readable storage medium, including for example, non-transitory media such as flash memory, permanent memory such as read-only memory ("ROM"), semi-permanent memory such as random access memory ("RAM"), any other suitable type of storage component, or any combination thereof. A computer readable storage medium, as used herein, is not to be construed as being a transitory signal per se. In some embodiments, an input/output system 160 (BIOS) including the basic routines that help to transfer information between the various other components of the computing device 105, such as during start-up, may be stored in the ROM. Additionally, data and/or program modules 165, such as at least a portion of operating system 145, application programs 150, and/or program data 155, that are accessible to and/or presently being operated on by the processor 115 may be contained in the RAM.

The communication interface 140 may include any transceiver-like mechanism (e.g., a network interface, a network adapter, a modem, or combinations thereof) that enables the computing device 105 to communicate with remote devices or systems, such as a mobile device or other user devices 210. For example, the computing device 105 may be connected to remote devices or systems via one or more local area networks (LAN) and/or one or more wide area networks (WAN) using the communication interface 140.

As discussed herein, the computing system 100 may be configured to connect with a user device 210 via an alternate communications network, receive device information for the user device 210 via the alternate communications network, determine whether the user device 210 is authorized to receive network credentials based on the device information, and provide the network credentials to the user device 210 via the alternate communications network (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the results of such tasks in accordance with aspects of the present disclosure. The steps, methods and/or functionality disclosed herein can be implemented in any combination of hardware circuitry and software. In embodiments, a user device 210 may communicate with computing system 100. The user device 210 may include one or more components of the computing system 100.

Figure 2:
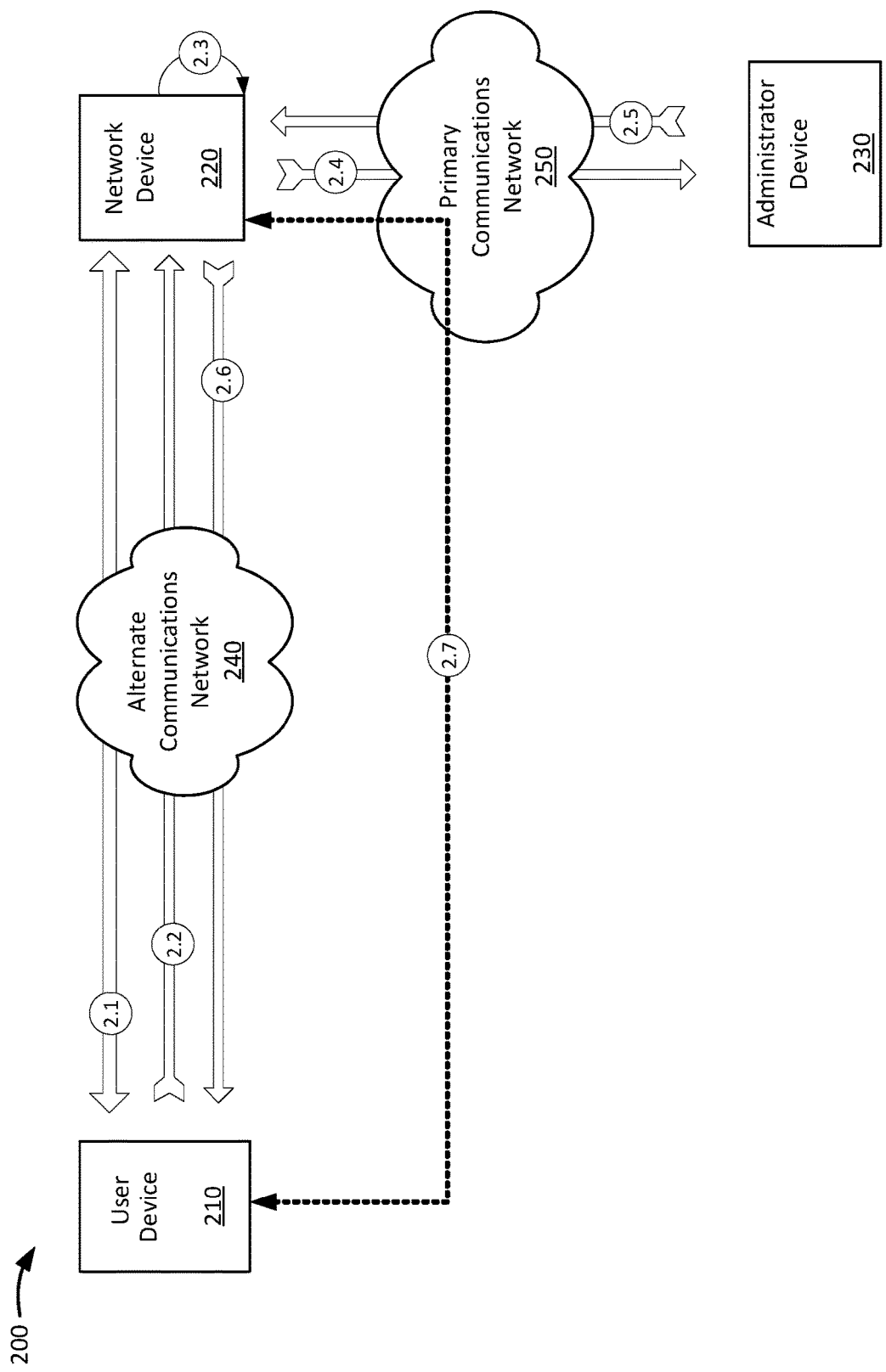
FIG. 2 shows an overview of an example implementation in accordance with aspects of the present disclosure.

FIG. 2 shows an overview of an example implementation in accordance with aspects described herein. As shown in FIG. 2, environment 200 may include a user device 210, a network device 220, an administrator device 230, an alternate communications network 240, and a primary communications network 250. In embodiments, the network device 220 may include one or more components of the computing system 100 of FIG. 1.

The user device 210 may include a computing device capable of communicating with the network device 220 via the alternate communications network 240 and the primary communications network 250. For example, the user device 210 may include a laptop computer, a desktop computer, a tablet, a smart phone, a mobile computing device, and/or a consumer electronics device (e.g., a network-enabled television, set-top box, or the like), which can access a network (e.g., a LAN) via the network device 220 and the alternative communications network 240, e.g., Bluetooth. The user device 210 may include alternate network communications hardware in order to communicate with the network device 220 via the alternate communications network 240. For example, the user device 210 may include Bluetooth communications hardware, or the like.

Still referring to FIG. 2, the network device 220 may include a router, a switch, a hub, an access point, or the like that implements or provides access to a LAN (e.g., corresponding to the primary communications network 250). The network device 220 may include alternate network communications hardware in order to communicate with the user device 210 via the alternate communications network 240. For example, the network device 220 may include Bluetooth communications hardware, or the like. In embodiments, the network device 220 may include one or more components of the computing system 100 of FIG. 1.

The administrator device 230 may include a computing device which is configured to communicate with the network device 220 using the primary communications network 250. In embodiments, the administrator device 230 and the network device 220 may also communicate through the use of the alternate communications network 240. In embodiments, the administrator device 230 may provide credentials to the network device 220, including authorizing access of the user device 210 to the LAN associated with the network device 220.

The alternate communications network 240 may include a network via which the user device 210 and the network device 220 may communicate in order for the network device 220 to provide the user device 210 with network credentials. In embodiments, the alternate communications network 240 may include a WPAN, such as a Bluetooth network, a ZigBee network, or the like.

The network 250 may include a LAN hosted and/or accessible by the network device 220. For example, the primary communications network 250 may include a LAN, wireless LAN (WLAN), a WiFi network, or the like. As described herein, the alternate communications network 240 and primary communications network 250 may be different and separate networks of different types. In particular, the alternate communications network 240 may include a PAN or WPAN (e.g., a Bluetooth network, Zigbee network, etc.) and the primary communications network 250 may include a LAN, WLAN, WiFi network, or the like.

As shown in FIG. 2, at step 2.1 the user device 210 may establish communications with the network device 220 via the alternate communications network 240. For example, as described herein, the user device 210 and the network device 220 may each implement communications hardware (e.g., a Bluetooth radio) via which the user device 210 and the network device 220 may communicate (e.g., using a Bluetooth interface). In embodiments, the communications between user device 210 and network device 220 may be established using any known connection and authentication techniques. For example, as should be understood to those of ordinary skill in the art, a user of user device 210 may provide an instruction (e.g., via a user interface of user device 210) to connect to the network device 220 using, for example, a Bluetooth interface (e.g., based on a Bluetooth pairing procedure). In embodiments, a PIN number may be used to authorize the establishment of the connection between the user device 210 and the network device 220 via the alternate communications network 240.

At step 2.2, the user device 210 may provide information regarding the user device 210 to the network device 220. For example, the user device 210 may provide identification information (e.g., a customized or user configurable network name of the user device 210, a media access control (MAC) address, or the like). Further user device 210 may provide a request to receive network credentials that the user device 210 may use to connect to a LAN hosted by or accessible from the network device 220.

At step 2.3 the client device 220 may look up the identification information of the user device 210 to determine whether the user device 210 is authorized to receive the network credentials. If the user device 210 is not authorized (e.g., if the identification information of the user device 210 is not stored on a "whitelist" maintained by the network device 220), at step 2.4, the network device 220 may query an administrator device 230 to authorize the user device 210. For example, the administrator device 230 may include a previously authorized device that has been given administrative permissions to authorize additional user devices 210 to access the LAN associated with the network device 220.

At step 2.5, the administrator device 230 may provide a response to the query (e.g., a response indicating that the user device 210 is authorized to access the LAN associated with the network device 220). For example, a user of the administrator device 230 may receive a notification from the network device 220 corresponding to the query, and may provide the response to the query (e.g., via a user interface of a network administration application) to authorize user device 210. In this way, the user device 210 may be authorized to access the LAN without the need to input network credentials into the user device 210.

In alternative or additional embodiments, the administrator device 230 may not receive the query or a notification, and network device 220 may store an indication that the user device 210 has requested to receive the network credentials. The administrator device 230 may access an administrative function of the network device 220 via a network control application or web browser (e.g., by logging in to the administrative function of the network device 220 via a local internet protocol address). The user of the administrator device 230 may provide a response to the stored request via a user interface (e.g., associated with a web browser or application).

Once the user device 210 has been authorized, at step 2.6, the network device 220 may provide the network credentials to the user device 210. In embodiments, the network device 220 may add the identification information of user device 210 to a "whitelist" and/or a MAC access list (e.g., such that user device 210 may receive updated network credentials in the future, and may access the LAN associated with the network device 220). At step 2.7, the user device 210 may access the LAN (e.g., represented by primary communications network 250) hosted or accessible via the network device 220 using the network credentials. In embodiments, particular steps shown in FIG. 2 may be omitted. For example, steps 2.4 and 2.5 may be omitted if user device 210 is currently authorized to receive the network credentials.

As described herein, the user device 210 may receive updated network credentials and connect to the LAN without the need for the network credentials to be manually updated by a user. For example, when the network credentials are updated, the user device 210 may connect to the network device 220 via the administrator device 230, receive the updated credentials, store the updated credentials, and use the updated credentials to access the LAN. As described herein and as should be understood by those of ordinary skill in the art, the user device 210 may automatically establish a connection (e.g., a Bluetooth connection) with network device 220 via the alternate communications network 240 each time the user device 210 is powered on and in communications range with network device 220. The network device 220 then provides the current network login credentials each time the connection is established via the alternate communications network 240.

Alternatively, the user device 210 may establish a connection with the network device 220 via the alternate communications network 240 when the user device 210 fails to connect to the LAN using its stored network credentials. The network device 220 may then provide current or updated credentials to the user device 210 in order for the user device 210 to access the LAN. Alternatively, the network device 220 may establish a connection with the user device 210 via the alternate communications network 240 when the network credentials of the LAN are updated. The network device 220 may then provide current or updated credentials to the user device 210 in order for user device 210 to access the LAN.

Figure 3:
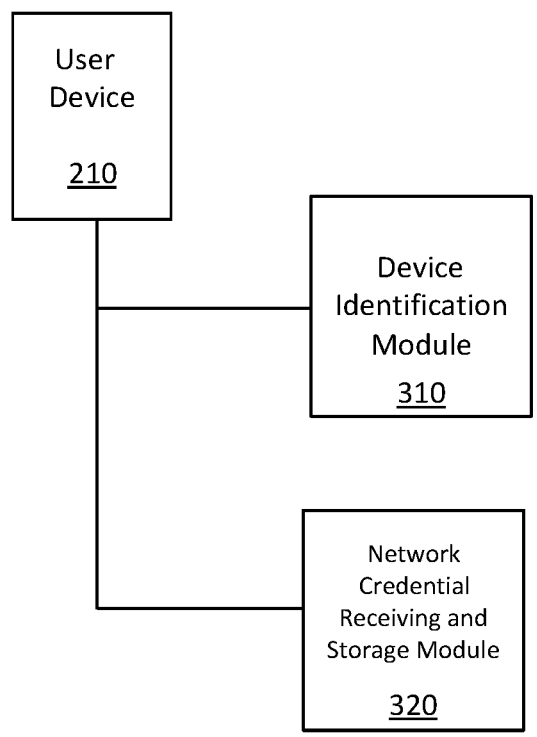
FIG. 3 illustrates example components of a user device in accordance with aspects of the present disclosure.

FIG. 3 illustrates example components of a user device in accordance with aspects of the present disclosure. As shown in FIG. 3, the user device 210 may include a device identification module 310 and a network credential receiving and storage module 320. The device identification module 310 may store identification information regarding the user device 210, such as a network name of the user device 210, a MAC address of the user device 210, etc. The device identification module 310 may provide the identification information to the network device 220 via the network credential receiving and storage module 320.

The network credential receiving and storage module 320 may include communications hardware via which the user device 210 may communicate with the network device 220 over the alternate communications network 240 (e.g., a Bluetooth radio, ZigBee radio, etc.). The network credential receiving and storage module 320 may provide device identification information for the user device 210 and may receive network credentials from the network device 220 used to wirelessly access a LAN implemented or accessibly by the network device 220. The network credential receiving and storage module 320 may store the network credentials for future use (e.g., to access the LAN at a least time after disconnecting from the LAN). The network credential receiving and storage module 320 may receive updated network credentials from the network device 220 via the altercate communications network 240, and may store the updated credentials. In this way, updated credentials may be received and stored without a user of the user device 210 being required to manually input the updated credentials.

Figure 4:
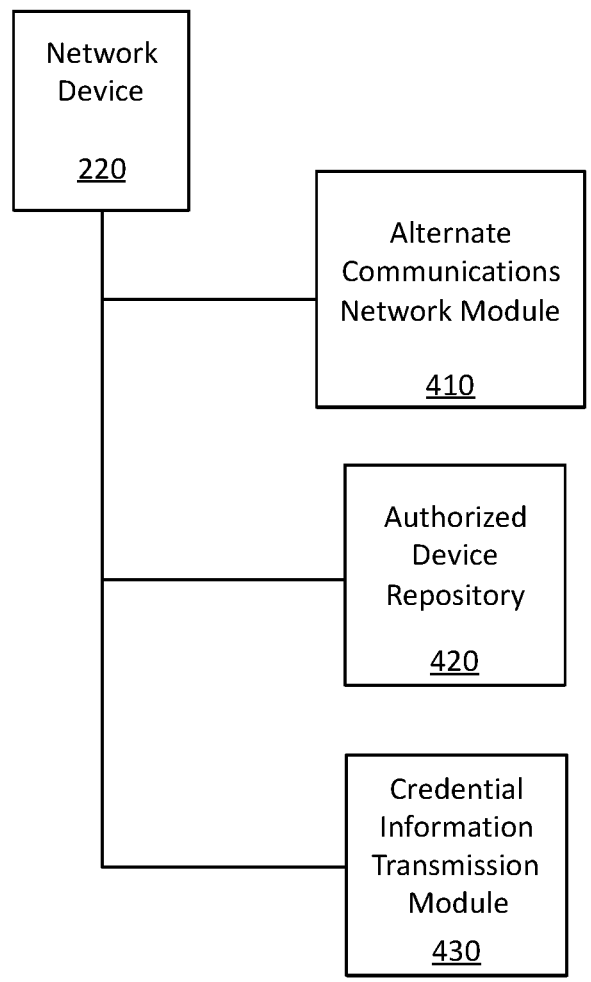
FIG. 4 illustrates example components of a network device in accordance with aspects of the present disclosure.

FIG. 4 illustrates example components of a network device in accordance with aspects of the present disclosure. As shown in FIG. 4, the network device 220 may include an alternate communications network module 410, an authorized device repository 420, and a credential information transmission module 430. The alternate communications network module 410 may include communications hardware via which the network device 220 may communicate with the user device 210 over the alternate communications network 240 (e.g., Bluetooth hardware, ZigBee hardware, WPAN hardware, or the like).

The authorized device repository 420 may store device identification information for user devices 210 authorized to receive network credentials from the network device 220 (e.g., network credentials used to access a LAN implemented or accessible by the network device 220). In embodiments, the authorized device repository 420 may store a "white list" identifying user devices 210 that are authorized to receive the network credentials. Alternatively, the authorized device repository 420 may store a "blacklist" identifying user devices 210 that are not authorized to receive the network credentials.

The authorized device information stored by authorized device repository 420 may be received from an administrator device 230 associated with the network device 220. In embodiments, the authorized device repository 420 may store MAC addresses of authorized user devices 210. The MAC addresses stored by the authorized device repository 420 may correspond to a MAC access control list implemented by the network device 220. In embodiments, the administrator device 230 may add or remove authorized device information from the authorized device repository 420 at any time.

The credential information transmission module 430 may provide network credential information to authorized user devices (e.g., as identified by the authorized device repository 420). For example, the credential information transmission module 430 may provide the network credential information when an authorized user device 210 connects to the user device 210 via the alternate communications network 240. In embodiments, the credential information transmission module 430 push the network credential information to authorized user devices 210 when the network credential information is updated.

Figure 5:
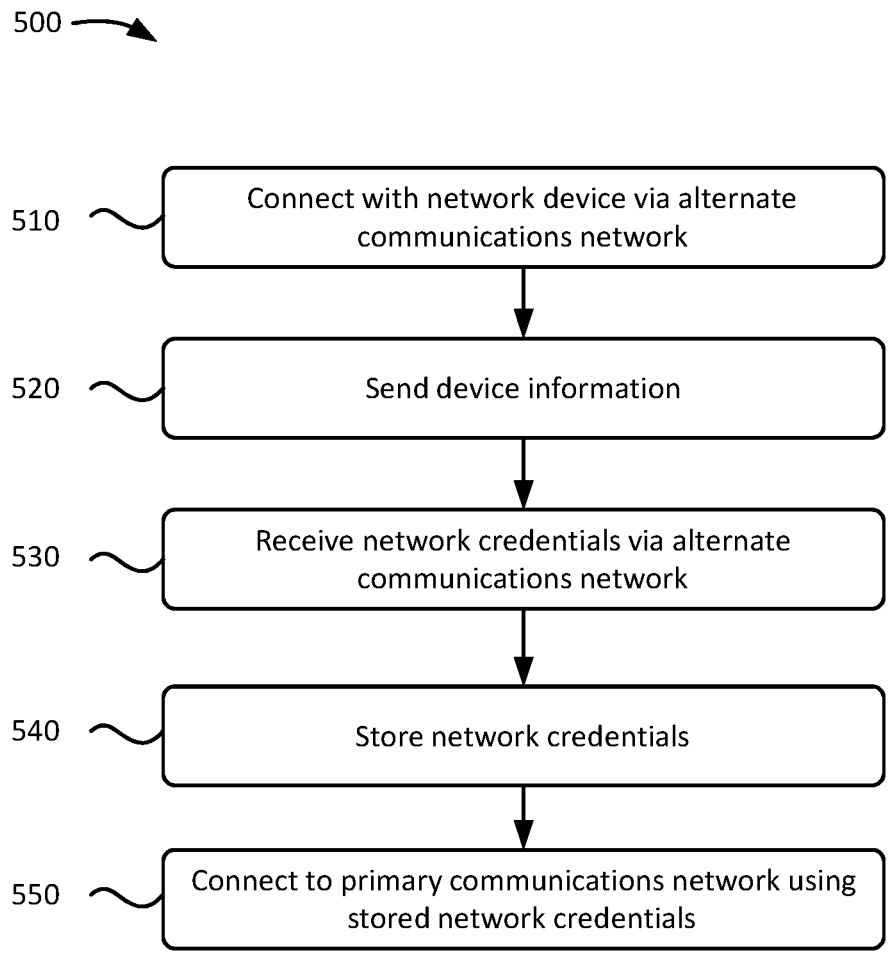
FIG. 5 shows an example flowchart for receiving network credentials via an alternate communications channel in accordance with aspects of the present disclosure.

FIG. 5 shows an example flowchart for receiving network credentials via an alternate communications channel in accordance with aspects of the present disclosure. The steps of FIG. 5 may be implemented in the environment of FIGS. 1-4, for example, and are described using reference numbers of elements depicted in FIGS. 1-4. As noted herein, the flowchart illustrates the architecture, functionality, and operation of possible implementations of systems, methods, and computer program products according to various embodiments of the present disclosure.

As shown in FIG. 5, process 500 may include connecting with a network device 220 via an alternate communications network 240 (step 510). For example, the user device 210 may connect with the network device 220 via the alternate communications network 240 (e.g., based on a Bluetooth pairing technique). In embodiments, the user device 210 may establish a connection via the alternate communications network 240 when the user device 210 and the network device 220 are within communications range of each other. As an illustrative example, the user device 210 may establish a Bluetooth connection with the network device 220 when the user device 210 and the network device 220 are within Bluetooth range of each other. For example, as should be understood by those of ordinary skill in the art, a user of user device 210 may provide an instruction (e.g., via a user interface of user device 210) to connect to the network device 220 using, for example, a Bluetooth interface (e.g., when the network device 220 is in a Bluetooth discovery mode). In embodiments a PIN number may be used to authorize the establishment of the connection between the user device 210 and the network device 220 via the alternate communications network 240 (e.g., a Bluetooth network). As should be understood by those of ordinary skill in the art, a trust relationship may be established when the user device 210 is initially paired with network device 220 via. Bluetooth using the PIN such that user device 210 and network device 220 may connect via Bluetooth in future instances without reentry of the PIN and without the network device 220 needing to be in Bluetooth discovery mode.

At step 520, device information may be sent to the network device 220. For example, the user device 210 may send device information to the network device 220 as part of a request to receive network credentials from the network device 220 via the alternate communications network 240. In embodiments, the device information may include a MAC address of the user device 210, a network name of the user device 210, and/or other information regarding the user device 210. In embodiments, the MAC address may include a MAC address associated with a wireless LAN adapter of the user device 210 (e.g., as opposed to a MAC address associated with Bluetooth hardware of user device 210).

As described herein, the network device 220 may use the received device information to determine whether the user device 210 is authorized to receive network credentials that the user device 210 may use to wireless connect to a LAN hosted or accessible by the network device 220. For example, the network device 220 may determine that the user device 210 is authorized based on the device information of user device 210 and information stored by the authorized device repository 420. The network device 220 may query an administrator device 230 to authorize user device 210 if user device 210 is not currently authorized to receive the network credentials, and may update the authorized device repository 420 to indicate that the user device 210 is now authorized (e.g., by adding the device information of user device 210 to a whitelist and/or removing the device information from a blacklist).

At step 530, network credentials may be received by the user device via the alternate communications network. For example, the user device 210 may receive the network credentials via the alternate communications network (e.g., Bluetooth network) after network device 220 determines that user device 210 is authorized to receive the network credentials.

At step 540, the network credentials may be stored (e.g., by the user device 210). At step 550, the user device 210 may connect to the primary communications network 250 (e.g., the LAN hosted or accessible by the network device 220) using the stored network credentials. The network credentials may be stored for future use (e.g., to permit the user device 210 to connect to the primary communications network 250 at a later time). In this way, network credentials can be received by the user device 210 via an alternate communications network 240 (e.g., a Bluetooth network), thereby eliminating the need for a user of the user device 210 to manually input the network credentials. As described herein, updated network credentials may be obtained via the alternate communications network 240.

Figure 6:
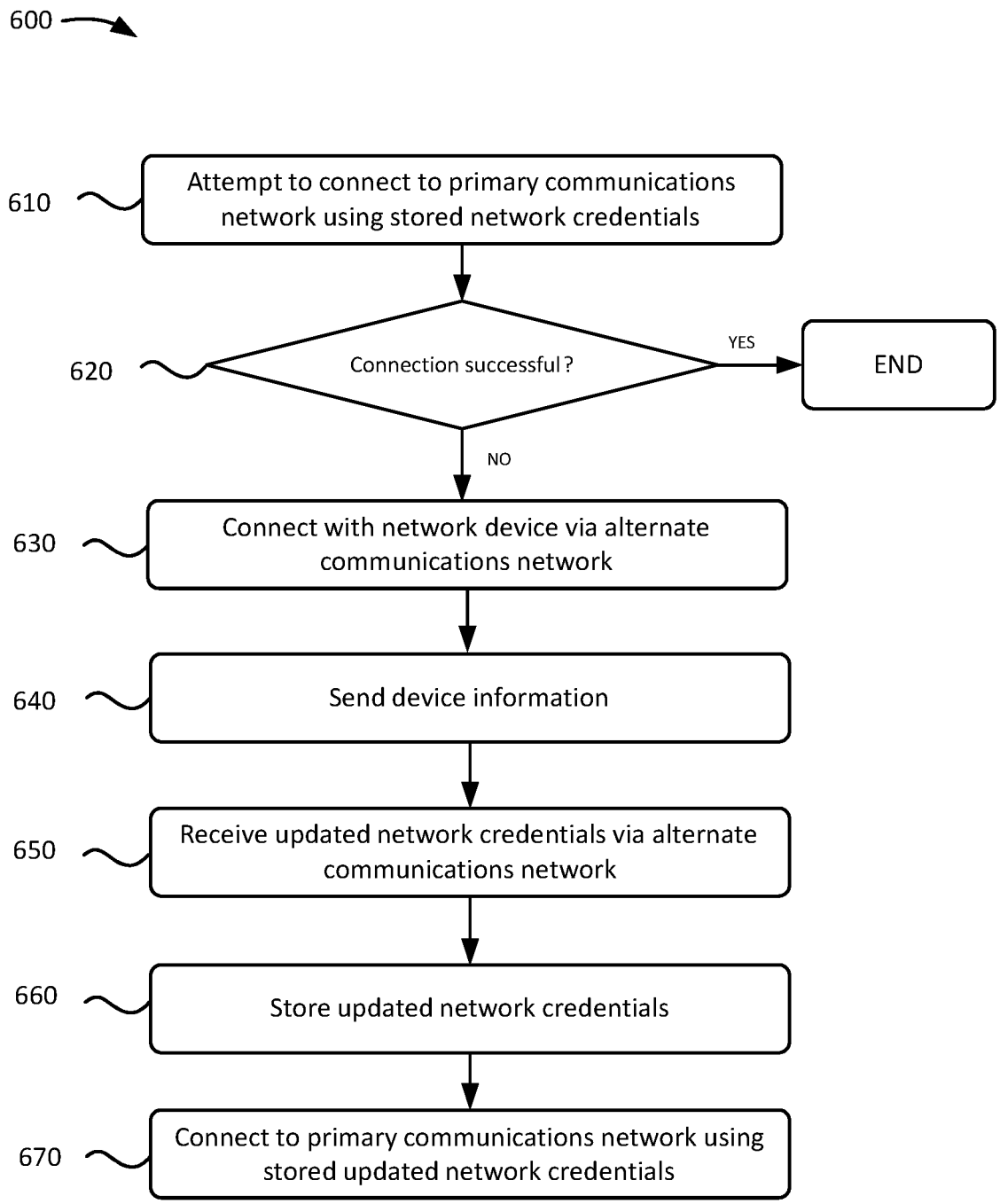
FIG. 6 shows an example flowchart for requesting updated network credentials by a user device via an alternate communications channel in accordance with aspects of the present disclosure.

FIG. 6 shows an example flowchart for requesting updated network credentials by a user device via an alternate communications channel in accordance with aspects of the present disclosure. The steps of FIG. 6 may be implemented in the environment of FIGS. 1-4, for example, and are described using reference numbers of elements depicted in FIGS. 1-4. As noted herein, the flowchart illustrates the architecture, functionality, and operation of possible implementations of systems, methods, and computer program products according to various embodiments of the present disclosure.

As shown in FIG. 6, process 600 may include attempting to connect to the primary communications network 250 (e.g., a wireless LAN hosted or accessibly by the network device 220) using stored network credentials. For example, the user device 210 may attempt to connect to the primary communications network 250 using network credentials that were previously stored (e.g., as discussed above with respect to process step 540). If the connection is successful, at step 620, the process ends. For example, the connection would be successful if the network credentials stored by the user device 210 are up to date (e.g., if the network credentials have not changed since user device 210 previously stored the network credentials).

If, on the other hand, the connection is not successful (e.g., if user device 210 receives an error message indicating that the network credentials are incorrect), process 600 may continue to step 630 in which the user device 210 may connect with the network device 220 via the alternate communications network 240. As user device 210 has previously connected with network device 220 via the alternate communications network 240 (as described above with respect to process step 510), the user device 210 may connect with the network device 220 via the alternate communications network 240 without user involvement (e.g., without the need for a PIN to be inputted by the user). At step 640, the user device 210 may send device information to the network device 220 via the alternate communications network 240, and at step 650, may receive updated network credentials via the alternate communications network 240 (e.g., in a similar manner as discussed above with respect to process steps 520 and 530).

At step 660, the user device 210 may store updated network credentials (e.g., by overwriting the previous network credentials), and at step 670 may connect to the primary communications network 250 using the stored updated network credential. In this way, the user device 210 may automatically receive updated network credentials without requiring the user to manually input the updated network credentials. Further, when the user device 210 has been previously authorized to receive network credentials from the network device 220, the user device 210 may receive the updated network credentials without requiring an additional authorization response from the administrator device 230. In a situation in which a user, household, or group uses multiple different user devices 210, substantial time and effort is saved when network credentials are updated, as the updated network credentials need not be inputted on each user device 210.

Figure 7:
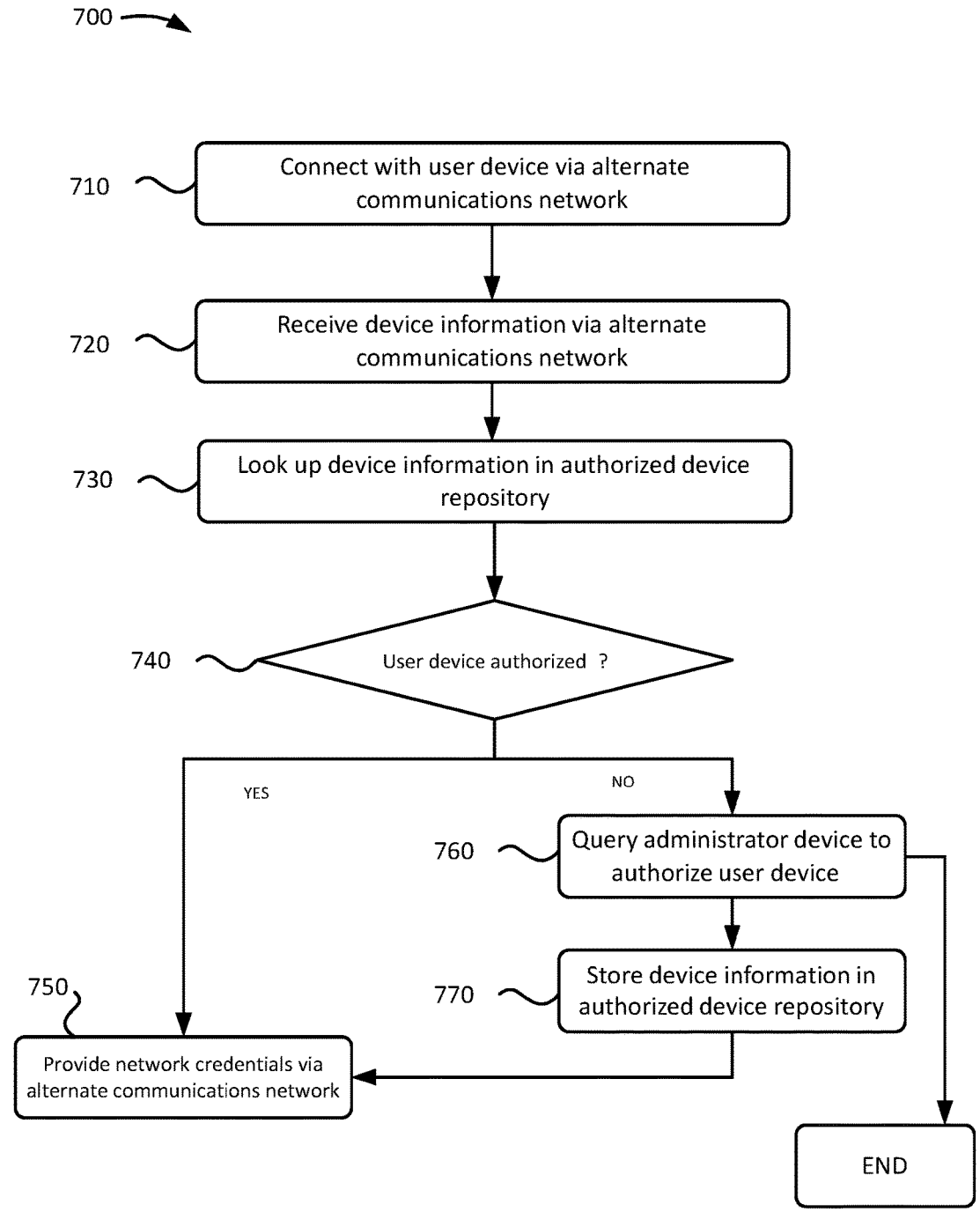
FIG. 7 shows an example flowchart for providing a user device with network credentials in accordance with aspects of the present disclosure.

FIG. 7 shows an example flowchart for providing a user device with network credentials in accordance with aspects of the present disclosure. The steps of FIG. 7 may be implemented in the environment of FIGS. 1-4, for example, and are described using reference numbers of elements depicted in FIGS. 1-4. As noted herein, the flowchart illustrates the architecture, functionality, and operation of possible implementations of systems, methods, and computer program products according to various embodiments of the present disclosure.

As shown in FIG. 7, process 700 may include connecting with a user device 210 via an alternate communications network 240. For example, the network device 220 may connect with the user device 210 via the alternate communications network 240 (e.g., in a similar manner as discussed above with respect to process steps 510 and 630). As should be understood by those of skill in the art, network device 220 may initially connect with the user device 210 via the alternate communications network 240 (e.g., a Bluetooth network) using a Bluetooth discovery mode and receipt of a PIN. A trust relationship may be established based on the initial connection such that the user device 210 and the network device 220 may later communicate via the alternate communications network 240 without reentry of the PIN and without network device 220 being in Bluetooth discovery mode.

At step 720, device information is received via the alternate communications network 240. For example, the network device 220 may receive the device information for user device 210 from the user device 210 (e.g., as part of a request to receive network credentials for a wireless LAN hosted or accessible by the network device 220).

At step 730, the network device 220 may look up the device information in the authorized device repository 420 (e.g., to determine if the user device 210 is authorized to receive network credentials). At step 740, the network device 220 may determine whether the user device 210 is authorized to receive the network credentials. For example, the network device 220 may determine that the user device 210 is authorized to receive network credentials when the device information for the user device 210 is on a whitelist or is not on a blacklist stored by the authorized device repository 420.

If, for example, the user device 210 is authorized, process 700 may proceed to step 750 in which the user device 210 may provide the network credentials to the user device 210 via the alternate communications network 240. If, on the other hand, the user device 210 is not authorized, process 700 may proceed to step 760 in which the user device 210 may query an administrator device 230 to authorize the user device 210.

In embodiments, the query may identify the device information of the user device 210 (e.g., a network name, description, owner, and/or other information regarding the user device 210). The administrator device 230 may receive the query via a user interface of the administrator device 230 from which a user of the administrator device 230 may respond to the query. For example, the administrator device 230 may present the device information along with an option to authorize or deny the device from receiving network credentials. If the authorization is denied, process 700 may end and the user device 210 may not receive the network credentials.

If authorization is provided, process 700 may proceed to step 770 in which the device information for the user device 210 is stored in the authorized device repository 420 (e.g., so that the user device 210 may receive future updates to the network credentials). Also, the network device 220 may store the device information (e.g., the MAC address of the user device 210) in a MAC address access or filtering list such that the user device 210 is permitted to wirelessly connect to the LAN associated with the network device 220. Process 700 may proceed to step 750 in which the user device 210 provides the network credentials to the user device 210 via the alternate communications network 240.

Figure 8:
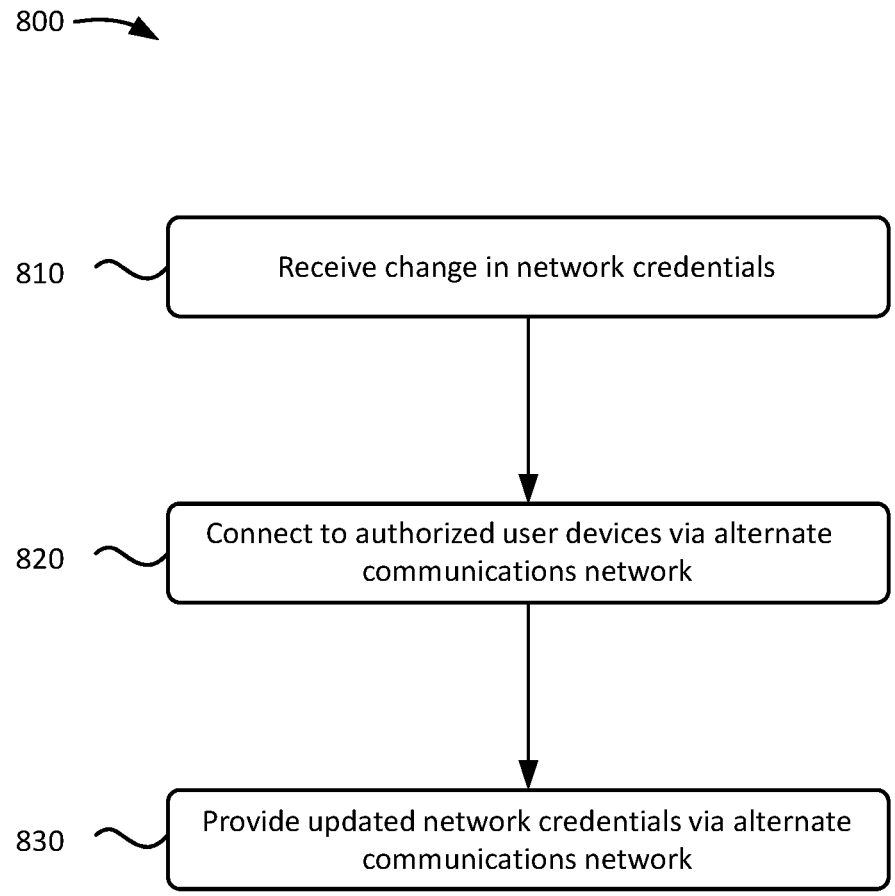
FIG. 8 shows an example flowchart for pushing updated network credentials to a user device via an alternate communications channel in accordance with aspects of the present disclosure.

FIG. 8 shows an example flowchart for pushing updated network credentials to a user device via an alternate communications channel in accordance with aspects of the present disclosure. The steps of FIG. 8 may be implemented in the environment of FIGS. 1-4, for example, and are described using reference numbers of elements depicted in FIGS. 1-4. As noted herein, the flowchart illustrates the architecture, functionality, and operation of possible implementations of systems, methods, and computer program products according to various embodiments of the present disclosure.

As shown in FIG. 8, process 800 may include receiving a change network credentials (at step 810). For example, the network device 220 may receive a change in network credentials via a user interface from a user or administrator of the network device 220. As a result of the change in network credentials, the user devices 210 will be unable to wirelessly connect to the LAN hosted or accessible by the network device 220. Accordingly, at step 820, network device 220 may connect to authorize the user devices 210 via the alternate communications network 240, and, at step 830, the updated network credentials are provided to the authorized user device 210 via the alternate communications network 240. In this way, the authorized user devices 210 may automatically receive updated network credentials, thereby reducing substantial time and effort network credentials are updated, as the updated network credentials need not be inputted on each user device 210.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer-implemented method comprising:
   connecting, by a network device having a credential information transmission module, with a user device via an alternate communications network;
   providing, by the network device to the user device and via the alternate communications network, network credentials used for providing the user device with wireless access and connection to a primary communications network;
   receiving an update to the network credentials;
   providing the updated network credentials to the user device via the alternate communications network;
   querying an administrator device for user device authorization based on determining that the user device is not authorized to receive the network credentials; and
   receiving a response from the administrator device authorizing the user device to receive the network credentials,
   wherein the primary communications network and the alternate communications network are different, and providing the network credentials is based on receiving the response from the administrator device.

2. The method of claim 1, further comprising receiving a request to provide the network credentials to the user device, wherein providing the network credentials is based on receiving the request.

3. The method of claim 2, wherein the request includes device information associated with the user device.

4. The method of claim 3, further comprising determining whether the user device is authorized to receive the network credentials based on the device information, wherein providing the network credentials is based on determining that the user device is authorized to receive the network credentials.

5. The method of claim 4, wherein determining whether the user device is authorized to receive the network credentials is further based on a whitelist or blacklist stored by the network device.

6. The method of claim 1, wherein querying the administrator device includes providing the device information to the administrator device.

7. The method of claim 1, further comprising storing the device information in an authorized device repository based on receiving the response from the administrator device.

8. The method of claim 1, wherein the network device is one of:
   a router;
   a switch; and
   a hub.

9. The method of claim 1, further comprising:
   accessing a stored query for user device authorization stored in the network device by accessing an administrative function of the network device using an administrator device via a web browser; and
   providing a response to the stored query via a user interface of the web browser authorizing the user device to receive the network credentials.

10. A computer program product for automatically configuring a user device to wireless access a local area network (LAN) associated with a network device, the computer program product comprising a computer readable storage medium having program instructions embodied therewith, the program instructions executable by a user device to cause the user device to:
    connect with a network device having a credential information transmission module via an alternate communications network;
    receive network credentials from the network device via the alternate communications network;
    wirelessly connect to the LAN using the received network credentials;
    receive an update to the network credentials;
    provide the updated network credentials to the user device via the alternate communications network; and
    providing the device information associated with the user device based on connecting with the network device via the alternate communications network,
    wherein receiving the network credentials is based on providing the device information, and providing the device information further causes the network device to provide a query to an administrator device to authorize the user device to receive the network credentials based on determining that the user device is not authorized to receive the network credentials.

11. The computer program product of claim 10, further comprising storing the network credentials.

12. The computer program product of claim 11, further comprising:
    attempting to wirelessly connect to the LAN using the stored network credentials;
    receive the updated network credentials from the network device; and
    wirelessly connect the LAN using the received updated network credentials.

13. The computer program product of claim 10, wherein providing the device information causes the network device to determine whether the user device is authorized to receive the network credentials based on the device information and to provide the network credentials based on determining that the user device is authorized to receive the network credentials.

14. A system comprising:
    a CPU, a computer readable memory and a computer readable storage medium associated with a network device having a credential information transmission module;
    program instructions to connect with a user device via an alternate communications network, wherein the alternate communications network is a Wireless Personal Area Network (WPAN);
    program instructions to receive a request to provide network credentials used to wirelessly access a primary communications network to the user device;
    program instructions to determine whether the user device is authorized to receive the network credentials based on the device information;
    program instructions to query an administrator device for user device authorization based on determining that the user device is not authorized to receive the network credentials;
    program instructions to receive a response from the administrator device authorizing the user device to receive the network credentials; and
    program instructions to provide, to the user device and via the alternate communications network, the network credentials used to wirelessly access a primary communications network, wherein:
the primary communications network is a Local Area Network (LAN) hosted by the network device, wherein:
the providing the network credentials causes the user device to receive and store the network credentials and to connect to the LAN using the network credentials,
the program instructions are stored on the computer readable storage medium for execution by the CPU via the computer readable memory,
the providing the network credentials is based on receiving the request, determining that the user device is authorized to receive the network credentials and receiving the response from the administrator device,
the determining whether the user device is authorized to receive the network credentials is further based on a whitelist or blacklist stored by the network device, and
the request includes device information associated with the user device.

15. The system of claim 14, further comprising alternate network communications hardware used to communicate with the user device via the alternate communications network.

16. The system of claim 15, wherein the alternate communications hardware includes Wireless Personal Area Network (WPAN) hardware.

17. The system of claim 14, further comprising:

program instructions to receive an update to the network credentials; and program instructions to provide the updated network credentials to the user device via the alternate communications network.

* * * * *